(12) United States Patent
Cohn et al.

(10) Patent No.: US 12,147,965 B2
(45) Date of Patent: Nov. 19, 2024

(54) AUTOMATIC OPTIMAL PAYMENT TYPE DETERMINATION SYSTEMS

(71) Applicant: Capital One Services, LLC, McLean, VA (US)

(72) Inventors: Andrew Cohn, Bethesda, MD (US); Katelyn Schultz, New York, NY (US); Fouad Alkisswani, New York, NY (US); Richard Elliott, Glen Allen, VA (US); Kylen Dau, Maidens, VA (US); Rajsaday Dutt, Vienna, VA (US); Marcelo Jabif Epsztejn, Reston, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/549,976

(22) Filed: Dec. 14, 2021

(65) Prior Publication Data

US 2022/0101297 A1  Mar. 31, 2022

Related U.S. Application Data

(63) Continuation of application No. 16/694,502, filed on Nov. 25, 2019, now Pat. No. 11,238,429.

(51) Int. Cl.
*G06Q 20/24* (2012.01)
*G06Q 20/02* (2012.01)
(Continued)

(52) U.S. Cl.
CPC ......... *G06Q 20/227* (2013.01); *G06Q 20/023* (2013.01); *G06Q 20/24* (2013.01); *G06Q 20/40145* (2013.01); *G06Q 20/403* (2013.01)

(58) Field of Classification Search
None
See application file for complete search history.

(56) References Cited

U.S. PATENT DOCUMENTS 6,073,840 A   6/2000  Marion
7,571,140 B2 * 8/2009  Weichert ............... G06Q 30/06
                                                    705/40

(Continued)

OTHER PUBLICATIONS

International Preliminary Report on Patentability in related PCT Application No. PCT/US2020/061993, mailed Jun. 4, 2022.

(Continued)

*Primary Examiner* — William J Jacob
(74) *Attorney, Agent, or Firm* — TROUTMAN PEPPER HAMILTON SANDERS LLP; Christopher J. Forstner; John A. Morrissett

(57) ABSTRACT

A system for providing a payment includes a processor and a memory configured to cause the system to receive a payment request representative of a payment amount, a payor identification, and a payee identification. The system includes means for determining payor cash holdings and payor available credit as well as authenticating the validity of a payment request and identity of the payor via received biometric data from a payor device. The system may further receive data representative of payee approved payment methods and determine a payment composition based on the payment amount, payor payment preferences, payor cash holdings and payor available credit. Based on the payee approved payment methods, the system may determine one or more payment types. The system may convey the payment amount to the payee in the form of one or more payment types and may fund the payment amount according to the payment composition.

18 Claims, 7 Drawing Sheets

(51) Int. Cl.
    *G06Q 20/22*               (2012.01)
    *G06Q 20/40*               (2012.01)

(56) References Cited

U.S. PATENT DOCUMENTS

| | | | |
|---|---|---|---|
| 9,445,244 B1 * | 9/2016 | Tolbert | H04W 4/08 |
| 10,373,204 B1 * | 8/2019 | Kandavanam | G06V 20/62 |
| 11,836,722 B2 * | 12/2023 | Mullaney | G06Q 20/401 |
| 2002/0062249 A1 | 5/2002 | Iannacci | |
| 2002/0082962 A1 * | 6/2002 | Farris | G07F 19/20 |
| | | | 705/35 |
| 2003/0023972 A1 * | 1/2003 | Gutta | H04N 21/812 |
| | | | 725/32 |
| 2004/0117302 A1 * | 6/2004 | Weichert | G06Q 20/1085 |
| | | | 705/40 |
| 2005/0240527 A1 | 10/2005 | Goldman | |
| 2006/0064380 A1 * | 3/2006 | Zukerman | G06Q 20/10 |
| | | | 705/44 |
| 2006/0206425 A1 | 9/2006 | Sharma | |
| 2007/0061402 A1 | 3/2007 | Mehr et al. | |
| 2007/0118472 A1 * | 5/2007 | Allen-Rouman | G06Q 20/10 |
| | | | 705/39 |
| 2007/0233615 A1 | 10/2007 | Tumminaro | |
| 2008/0103972 A1 | 5/2008 | Lanc | |
| 2012/0179559 A1 * | 7/2012 | Rogers | G06Q 30/06 |
| | | | 705/16 |
| 2012/0296726 A1 | 11/2012 | Dessert et al. | |
| 2012/0316992 A1 | 12/2012 | Osborne | |
| 2016/0210605 A1 * | 7/2016 | Vaish | G06Q 20/36 |
| 2019/0130050 A1 * | 5/2019 | Haas | G06F 16/215 |

OTHER PUBLICATIONS

Extended European Search Report in related EP Application No. 20894186.4, mailed Jun. 12, 2023.

* cited by examiner

AUTOMATIC OPTIMAL PAYMENT TYPE DETERMINATION SYSTEMS

CROSS REFERENCE TO RELATED APPLICATIONS

This application is a continuation of, and claims priority under 35 U.S.C. § 120 to, U.S. patent application Ser. No. 16/694,502, filed Nov. 25, 2019, the entire contents of which are fully incorporated herein by reference.

FIELD OF INVENTION

The present disclosure relates to automatic optimal payment type determination systems, and more particularly providing systems and methods for determining a preferred allocation of payment type or method (e.g., credit, check, ACH, and ACH plus transactions) that is dissociated from a payment composition (e.g., a debit portion and a credit portion).

BACKGROUND

When a customer contracts with a vendor to make a purchase, the customer must make a determination on how to pay for the transaction. Payments may take the form of an Automated Clearing House (ACH) transaction, an issued check, a credit card payment, and the like. In some situations, customers may prefer to use a credit card for payment because it allows the customer to delay when money will be transferred from his account. Customers may also prefer to use a credit card because of various rewards they may accrue by using a credit card. In other situations, paying with a check may be advantageous when the customer knows that the vendor may not cash the check for a period of time, effectively delaying when money will be transferred out of his account.

Additionally, vendors may have their own rules characterizing what forms of payment they either require or prefer, making it difficult for customers to plan for the most effective allocation of payment types when transacting with a vendor. When they do, it can be overly burdensome and time-consuming for a customer to manually contact potential vendors to ascertain acceptable methods of payment. Further, such communications can delay potential transactions by days or even weeks if the vendor responds by mail, rendering impractical certain payment methods or the transaction altogether.

Accordingly, there is a need for systems and methods that can automatically and quickly determine an optimal payment method while weighing vendor-acceptable payment methods and customer payment method preferences. Embodiments of the present disclosure are directed to this and other considerations.

SUMMARY

Disclosed embodiments provide systems and methods for providing an automatic payment method selection system.

Consistent with disclosed embodiments, the system may include one or more memory devices storing instructions, and one or more processors configured to execute the instructions to perform the steps of a method of providing an automatic payment method selection system. The system may execute the instructions to receive, from a payor device, payor payment preferences associated with a payor. The system may receive a payment request which may include a payment amount, an identification of the payor, and an identification of a payee. The system may determine payor cash holdings and payor available credit. The system may further receive, from a payee device associated with the payee, data representative of payee approved payment methods. The system may determine a payment composition based on the payment amount, payor payment preferences, payor cash holdings, and payor available credit. The payment composition may represent a debit portion with the debit portion being associated with a payment made from the payor cash holdings, and a credit portion with the credit portion being associated with a payment made against the payor available credit. The system may determine one or more payment types, where each of the one or more payment types are accepted by the payee in accordance with the payee approved payment methods. Finally, the system may execute a payment by conveying the payment amount to the payee in the form of the one or more payment types and funding the payment amount, in accordance with the payment composition. The payment may be funded by debiting the payor cash holdings an amount equal to the debit portion and crediting an amount equal to the credit portion against the payor available credit.

Consistent with the disclosed embodiments, methods for automatically selecting a preferred payment method are also disclosed.

Further features of the disclosed design, and the advantages offered thereby, are explained in greater detail hereinafter with reference to specific embodiments illustrated in the accompanying drawings, with like elements indicated by like reference designators.

BRIEF DESCRIPTION

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
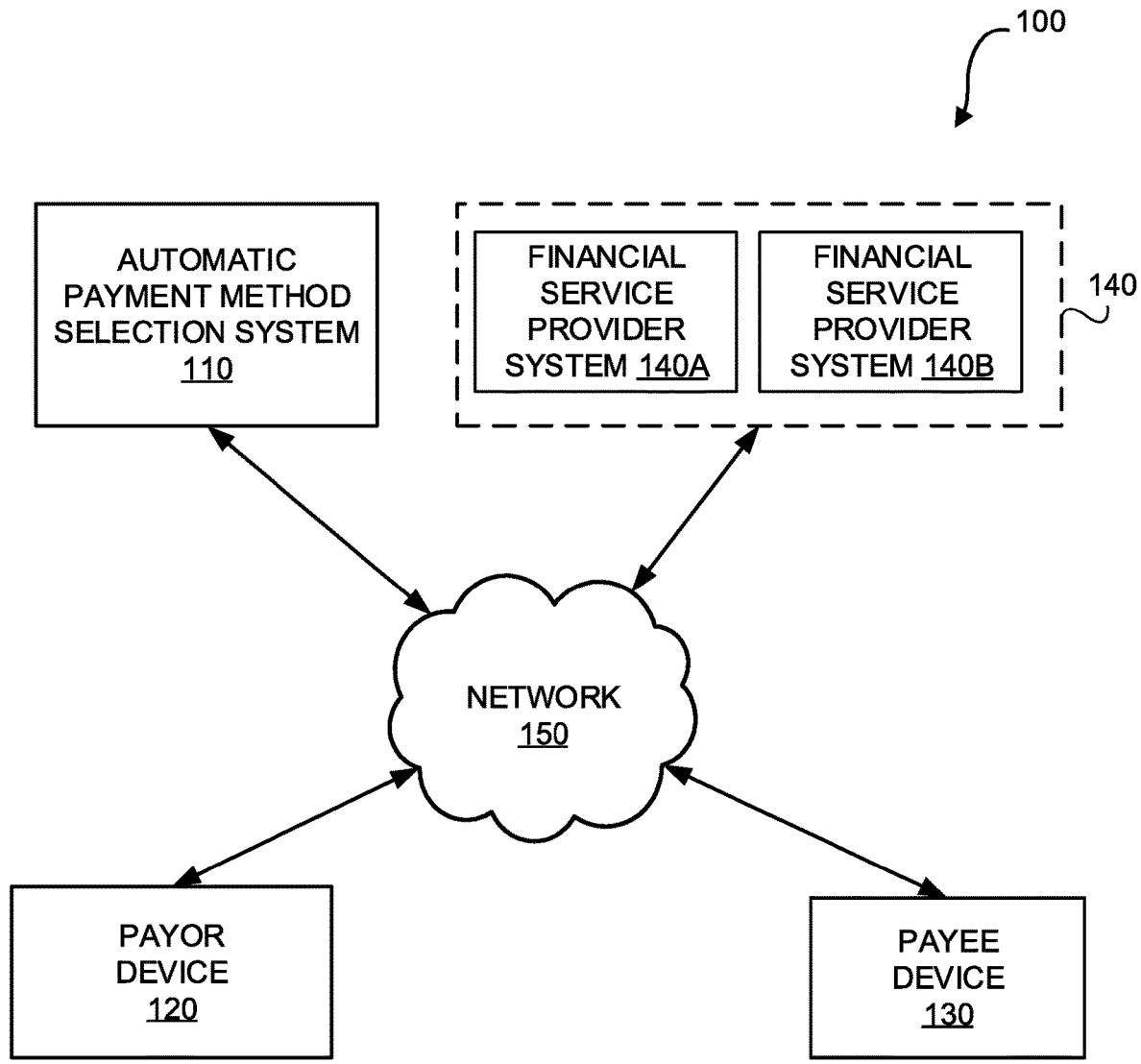
FIG. 1 is a system diagram of an automatic payment method selection system in accordance with some exemplary embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to one aspect of the disclosed technology, an automatic payment method selection system is disclosed. The automatic payment method selection system may include one or more processors and a memory storing instructions configured to cause the system to perform the steps of a method in accordance with the disclosed embodiments. More specifically, the automatic payment method selection system may receive payor payment preferences associated with a payor. Additionally, the system may receive a payment request including data representative of a payment amount, an identification of the payor, and an identification of a payee. Based on the received payment preferences and the payment request data, the system may determine the payor's cash holdings and the payor's available credit. The system may further receive, from a payee device associated with the payee, data representative of payee approved payment methods. The data representative of payee approved payment methods may include, for example, rules for accepting payment by credit card for payors when the payment amount is less than some predetermined threshold (e.g., when the payment is less than $100,000, payee may accept credit card transactions) or any rule set that defines the scope of payment methods allowed by the payee device. Further, the system may determine a payment composition based on the payment amount, payor payment preferences, payor cash holdings and payor available credit. The payment composition may represent a debit portion associated with a payment made from the payor cash holdings and a credit portion associated with a payment made against the payor's available credit line. The system may further determine, based on the payee approved payment methods and the payor payment preferences one or more payment types. Each of the payment types may be accepted by the payee in accordance with the payee approved methods. The payment type may be disassociated with the payment composition, such that a payor may pay with a credit card (payment type) but the money may be transferred to the payee in part by a debit transaction against the payor's cash holdings and in part by a credit against the payor available credit. The system may execute a payment, which may include conveying the payment amount to the payee in the form of the one or more payment types and funding the payment amount in accordance with the payment composition. The system may fund the payment amount in accordance with the payment composition by debiting the payor cash holdings an amount equal to the debit portion of the payment and crediting an amount equal to the credit portion against the payor available credit.

According to some embodiments, the system may include payment types including payment by one or more of a debit to a deposit account, an ACH transaction, an ACH plus transaction, and a credit against a credit account.

According to some embodiments of the disclosed technology, receiving data representative of payee approved payment methods may include transmitting a payee approved payment method request to the payee by at least one of an interactive voice response system, an automated e-mail system, and an automated mailing system. The system may further receive a payee approved method response from the payee and determine, based on the payee approved method response, one or more approved payment methods. For example, the payee may require a payor to pay by debit card for orders less than a predetermined threshold. In response, the system may modify the payor payment preferences in order to satisfy the payee approved payment methods.

In another embodiment of the disclosed technology, the one or more payment types are disassociated from the payment composition such that any one of the one or more payment types may correspond to either one of the credit portion or debit portion of the payment composition. For example, a payor may convey a payment by a check, but the payment amount may be funded by crediting in part or in whole the amount conveyed against the payor's available credit.

In another embodiment of the disclosed technology, the system may be further configured to respond to receiving the payment request. The system may be further configured to transmit, to a payor device, a payment verification request representing a request to verify the authenticity of the payment request and a request to authenticate the payor. The request to authenticate the payor may include a request for the payor device to obtain biometric data associated with the payor. The system may further receive, from the payor device, a payment verification response including an indication that the payment request is valid. Additionally, the system may receive biometric data obtained by one or more sensors of the payor device responsive to receiving the payment verification request. Responsive to determining that the received biometric data matches stored biometric data of the payee within a predetermined confidence level, the system may further verify the authenticity of the payment request.

In another embodiment, conveying the payment amount to the payee in form of one or more payment types may include receiving a merchant identifier associated with a preexisting payee account. The system may determine, based on a machine learning trained algorithm, that the identification of the payee corresponds to the merchant identifier and convey the at least a portion of the payment amount to the preexisting payee account.

In another embodiment of the disclosure, determining payor cash holdings and payor available credit may include identifying a payor financial institution associated with the payor. The system may transmit to the payor financial institution via an API a request for payor financial information. In response, the system may receive, via the API, data representative of the payor cash holdings and/or payor available credit. In accordance with this embodiment, the system may allow for a payor to utilize cash and credit holdings from third party financial institutions via the API request for financial information.

In another aspect of the disclosed technology, an automatic payment method selection system is disclosed. The system may include one or more processors and a memory storing instructions that are configured to cause the system to perform the steps of a method in accordance to the disclosed embodiments. More particularly, the system may receive payor payment preferences associated with a payor. The system may further receive a payment request including data representative of a payment amount, an identification of the payor and an identification of a payee. The system may further determine payor cash holdings and payor available credit which may include identifying a payor financial institution and receiving, via an API, data representative of the payor cash holdings and payor available credit. The system may transmit a payor authentication request message to a payor device. Responsive to the payment authentication request message, the system may receive, from the payor device, biometric data obtained from one or more sensors associated with the payor device. The biometric data may be associated with the payor and may include at least one of a fingerprint scan, a retinal scan, a facial image, or a vocal sample, although all suitable biometric identifiers are contemplated for use in this embodiment. The system may verify the identity of the payor based on the received biometric data in order to validate the authenticity of the transaction. The system may receive, from a payee device associated with the payee, data representative of payee approved payment methods. In response, the system may determine a payment composition based on the payment amount, the payor payment preferences, the payor cash holdings, and the payor available credit. The payment composition may include a debit portion and/or a credit portion, with the debit portion associated with a payment made from the payor cash holdings and a credit portion with the credit portion associated with a payment made against the payor available credit. The system may determine, based on the payee approved payment methods and the payor payment preferences, one or more payment types. To determine the one or more payment types, the system is configured to compare the payor payment preferences with the payee approved payment methods according to a rule hierarchy. The rule hierarchy may enable a payment type by the payor only if the payment type conforms to the payee approved payment methods. In response to payor payment preferences conforming with the payee approved payment methods, the system may execute a payment. Executing a payment may include conveying the payment amount to the payee in the form of the one or more payment types and funding the payment amount, in accordance with the payment composition, from the payor. The system may fund the payment amount by debiting the payor cash holdings an amount equal to the debit portion of the payment composition and crediting an amount equal to the credit portion of the payment composition against the payor available credit.

In some embodiments of the disclosed invention, the one or more payment types may include payment by one or more of a debit to a deposit account, an ACH transaction, an ACH plus transaction, and a credit against a credit account.

In some embodiments, receiving data representative of payee approved payment methods includes transmitting a payee approved payment method request to the payee via at least one of an interactive voice response system, an automated e-mail system, and an automated mailing system. The system may receive a payee approved method response from the payee and determine, based on the payee approved method response, one or more approved payment methods.

In some embodiments, the one or more payment types are dissociated from the payment composition such that any one of the one or more payment types may correspond to either one of the credit portion or debit portion of the payment composition. Accordingly, the system may be capable of processing a check, ACH, or ACH plus payment type at least in part as a credit against the payor available credit. Similarly, the system may process a credit card payment type by debiting the payor cash holdings rather than processing the credit card transaction as a credit against the payor available credit.

In another embodiment, conveying the payment amount to the payee in the form of the one or more payment types may further include receiving a merchant identifier associated with a preexisting payee account. Responsively the system may determine, based on a machine learning trained algorithm, that the identification the payee corresponds to is the merchant identifier. Once the payee identity is confirmed, the system may convey at least a portion of the payment amount to the preexisting payee account.

In yet another aspect of the disclosed technology, an automatic payment method selection system is disclosed. The system may include one or more processors and a memory storing instructions that are configured to cause the system to perform the steps of a method as disclosed herein. The system may receive payor payment preferences associated with a payor and a payment request. The payment request may include data representative of a payment amount, an identification of the payor, and an identification of a payee. Based on the received payor identification, the system may determine payor cash holdings and payor available credit by sending an information request to a financial institution associated with the payor. The system may receive, from a payee device associated with the payee, data representative of payee approved payment methods. For example, a payee may wish to only take credit cards as a payment type when the sale price is less than $100,000. The system may determine a payment composition based on the payment amount, payor payment preferences, payor cash holdings, and payor available credit. The payment composition may represent a debit portion associated with a payment made from the payor cash holdings and a credit portion associated with a payment made against the payor available credit. Finally, the system may execute a payment consisting of one or more payment types. Executing the payment may include conveying the payment amount to the payee in the form of the one or more payment types in accordance with the payment composition by debiting the payor cash holdings an amount equal to the debit portion of the transaction and crediting an amount equal to the credit portion of the transaction against the payor available credit.

In some embodiments, the payment types may include payment by one or more of a debit to a deposit account, an ACH transaction, an ACH plus transaction, and a credit against a credit account.

In another embodiment, receiving data representative of payee approved payment methods includes transmitting a payee approved payment method request to the payee via at least one of an interactive voice response system, an automated e-mail system, and an automated mailing system. The system may receive a payee approved method response from the payee and the system may in turn determine, based on the payee approved method response, one or more approved payment methods.

In another embodiment, the one or more payment types may be dissociated from the payment composition in such a way that any one of the one or more determined payment types may correspond to either one of the credit portion or debit portion of the payment composition.

In another embodiment, the system is further configured to further respond to receiving the payment request. The system may transmit, to the payor device, a payment verification request representing a request to verify the authenticity of the payment request and to authenticate the payor. To authenticate the payor, the system may include a request for the payor device to obtain payor biometric data. The system may receive, from the payor device, a payment verification response including an indication that the payment request is valid and biometric data obtained by one or more sensors of the payor device responsive to receiving the payment verification. Finally, the system may verify the authenticity of the payment request based on the payment verification response responsive to determining that the received biometric data matches stored biometric data of the payee within a predetermined threshold.

In another embodiment, conveying the payment amount to the payee in the form of the one or more payment types may include receiving a merchant identifier associated with a preexisting payee account and determining, based on a machine learning trained algorithm, that the identification the payee corresponds to is the merchant identifier. Based on the determination, the system may convey at least a portion of the payment amount to the preexisting payee account.

In another embodiment, determining payor cash holdings and payor available credit may include identifying a payor financial institution associated with the payor and transmitting to the payor financial institution, via an API, a request for payor financial information. In response, the system may receive, via the API, data representative of the payor cash holdings and/or payor available credit. Accordingly, the system is capable of handling transactions in which the automatic payment method selection system is provided by a different financial institution than the one associated with the payor cash holdings and payor available credit.

In yet another embodiment, a sum of the credit portion and the debit portion of the payment composition are equal to the payment amount.

Although some of the above embodiments are described with respect to systems, it is contemplated that embodiments with identical or substantially similar features may alternatively be implemented as methods and/or non-transitory computer-readable media, and vice versa.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to facilitate payment(s) from a payor to a payee in accordance with the methods disclosed herein. An executed payment may consist of one or more payment types and the composition of the payment may be dissociated from the payment type(s) such that any one of the payment types may correspond to either a credit portion or a debit portion of the payment composition. Accordingly, a payor using the system 100 may fund transactions against his or her available credit by means of conveying a payment by check, or similarly, a payor may fund transactions with his or her available cash holdings by conveying a payment by credit card. System 100 may be configured to allow the payee to specify one or more accepted payment methods that may constrain the payor's use of certain payment types, but may still allow a payor to make payment by using the payor cash holdings and available credit despite the instrument used to convey the funds to the payee (e.g., a payee may require that a payment is made by ACH transfer only, yet the system may still allow the payor to fund the payment against the payor available credit). Accordingly, the system may automatically update payor payment preferences in an attempt to honor the payee accepted payment methods according to a rule hierarchy.

In some embodiments, the one or more payment types may include payment by one or more of a debit to a deposit account, an ACH transaction, an ACH plus transaction, and a credit against a credit account. A payee may upload or otherwise input a payment request to the system 100 via a payee device 130, using one of the standard input/output (TO) methods of a computing device such as a keyboard, mouse, scanning device, or camera. If the payee device 130 is not registered with the system 100, an automatic payment method selection system 110 may transmit an information request including a request for an identification of a payee and data representative of payee approved payment methods to the payee device 130. The automatic payment method selection system 110 may request data representative of payee approved payment methods by transmitting a payee approved payment method request to the payee device by one of several automated methods including an interactive voice response system, an automated e-mail system, and/or an automated mailing system. If the payee is an existing client, the automatic payment method selection system 110 may transmit a payee approved payment method request to the payee device 130 to give the payee an opportunity to update payee approved payment methods.

The system 100 (e.g., via the automatic payment method selection system 110) may also receive payor payment preferences associated with the payor via a payor device 120, and responsive to receiving a payment request, determine payor cash holdings and payor available credit. The automatic payment method selection system 110 may identify a payor financial service provider (associated with a financial service provider system 140A or 140B) by looking up a payor's primary account number (PAN), provided by the payor via the payor device 120. Once the payor financial service provider has been identified, the automatic payment method selection system 110 may receive, via an API, data representing the payor cash holdings and payor available credit. In some embodiments, the automatic payment method selection system 110 may identify several financial service providers and receive payor cash holdings and available credit from each of these financial service providers. Accordingly, the payor may fund payments to the payee using a combination of several accounts that may be spread over several financial service providers. Further, the system 100 may include or have portions administered by a third party or unrelated financial service provider.

After payor cash holdings and available credit have been determined, the automatic payment method selection system 110 may transmit a payor authentication request to the payor device 120 in order to provide the payor an opportunity to authenticate the validity of the transaction. The payor may provide, via the payor device 120, biometric data associated with the payor obtained from one or more sensors of the payor device 120. Biometric data may include at least one of a fingerprint scan, a retinal scan, a facial image, or a vocal sample. Once received, the system 100 (e.g., via the automatic payment method selection system 110) may verify the identity of the payor and proceed with the transaction by conveying the payment amount in the form of the one or more payment types and funding the payment amount in accordance with the payment composition. Conveying the payment amount refers to the instrument by which the funds are transferred (e.g., a debit card, a check, etc.) and funding the payment refers to how the payment is processed (e.g., against payor available credit and/or from payor cash holdings). Accordingly, the payor may use system 100 to make payments to the payee wherein the payment composition may be dissociated with the payment type used to make the payment. The components and arrangements shown in FIG. 1 are not intended to limit the disclosed embodiments as the components used to implement the disclosed processes and features may vary. As shown, the automatic payment method selection system 110, the payor device 120, the payee device 130, the financial service provider systems 140A and 140B (collectively financial service provider systems 140) that make up the system 100 communicate with one another via a network 150.

The automatic payment method selection system 110 may include one or more of a general purpose computer, tablet computer, laptop computer, telephone, PTSN landline, mobile device, or any other device capable of communicating with the network 150 and ultimately communicating with one or more components of the system 100. According to some embodiments, the automatic payment method selection system 110 may communicate with the payor device 120, the payee device 130, and the financial service provider system 140 via the network 150. In some embodiments, the automatic payment method selection system may include an API that is configured to allow the system 100 to determine the payor cash holdings and available credit being held at one or more financial institutions associated with the payor.

As will be appreciated of those of skill in the art, a credit card may conventionally include a PAN that is a numerical code that is typically between 14 and 16 digits long. In some embodiments, the first six digits of the PAN represent a credit card network, the next set of digits represent a user account number and one or more final digits may represent an additional fraud security digit. According to some embodiments, upon entering a PAN into the system 100 to make a transaction using the automatic payment method selection system 110, the automatic payment method selection system 110 may receive transaction authorization data representative of the attempted transaction. Such transaction authorization data may include the PAN associated with the card used to make the attempted purchase, and may include other information related to the payor, such as the amount of the attempted transaction, the date and time of the attempted transaction, and an identification of the payee (e.g., this may be a payee corporate name, or a predetermined payee code) associated with the payee that initiated the payment request. According to some embodiments, the automatic payment method selection system 110 may receive transaction authorization requests comprising biometric data associated with the payor and may determine whether the transaction should be authorized. According to some embodiments, if the automatic payment method selection system 110 determines that the attempted transaction is authorized based on the received biometric data, the automatic payment method selection system 110 may generate an authorization message and transmit the authorization message to the payor (e.g., to the payor device 120) to notify the payor the transaction has been authorized. According to some embodiments, in determining the payor payment preferences before funding a transaction, the automatic payment method selection system 110 may identify the financial account(s) associated with the payor to make the attempted purchase, and compare the payor approved payment methods to a set of payee rules that apply to the transaction. For example, a payee may have an rule associated with the particular transaction that sets the maximum balance payable by credit card to $1,000, and so if the automatic payment method selection system 110 determines that the amount owed on the transaction is $1200 then the automatic payment method selection system 110 may modify the payor preferred method of payment to honor the payee accepted payment methods. Such rules may include maximum transaction payment limits for a method of payment (e.g., ACH, check, debit card, credit card), restrictions on geographic locations, restrictions relating to the time and date of the transaction, or restrictions relating to the type or identify of the payor with which an attempted transaction is made.

In some embodiments, in response to authorizing a transaction, the automatic payment method selection system 110 may store a record of the transaction and update account information such as the payor cash holdings and available credit associated with the financial account(s). Although the preceding description was made with respect to a credit card, it should be understood that other embodiments relating to other types of payment methods such as debit cards, checks, ACH transfers, and any other such type of financial account, including online financial accounts, are contemplated as well.

According to some embodiments, the automatic payment method selection system 110 may determine the identity of a payee associated with an attempted transaction based on the received identification of a payee included in the payment request data and/or other transaction authorization data such as the zip code and country code. For example, in some embodiments, the automatic payment method selection system 110 may be configured to determine the identity of the business, such as a chain of office supply stores, based on the received identification. According to some embodiments, the automatic payment method selection system 110 may determine information about the payee associated with a transaction such as the payee's name, type/category of payee, location, address and the like, by utilizing third party data (e.g., from publicly available online sources) and/or machine learning techniques to derive such information. According to some embodiments, the automatic payment method selection system 110 may be configured to determine one or more of a payee name, a payee location/address/zip code/country code based on a payee identification associated with the transaction.

The payor device 120 may be a mobile computing device (e.g., a smart phone, tablet computer, smart wearable device, portable laptop computer, voice command device, wearable augmented reality device, or other mobile computing device) capable of sending and receiving data over a network, such as a mobile network. Accordingly, a payor may communicate with the automatic payment method selection system 110 through interaction with the payor device 120. In response to a payment request, the automatic payment method selection system 110 may wish to authenticate the transaction, which includes sending an authentication request to the payor device 120, prompting the payor to input a biometric input to the payor device, wherein the input may be transmitted to the automatic payment method selection system for verification.

The payee device 130 may be a mobile computing device (e.g., a smart phone, tablet computer, smart wearable device, portable laptop computer, voice command device, wearable augmented reality device, or other mobile computing device) or a stationary device (e.g., desktop computer). Accordingly, the payee may initiate a transaction by sending a payment request to the automatic payment method selection system 110 via the payee device over the network 150.

The financial service provider system 140 may include a computer system configured to store information related financial accounts, such as checking accounts, savings accounts, credit cards accounts, and the like when the automatic payment method selection system 110 is administered by a different financial institution than the one used by the payor to make payment. The financial service provider system 140 may comprise multiple financial service providers with which the payor may have a financial account to be used in a payment through the system 100, (e.g., financial service provider system 140A, 140B, . . . , 140N). For example, the financial service provider system 140 may store account numbers, PANs, balances, transaction data, fund transfer information, and user account information. According to some embodiments, a payor may have one or more financial accounts associated with the financial service provider system 140. In some embodiments, the automatic payment method selection system 110 may be configured to send instructions to the financial service provider system 140 via the network 150 to cause the financial service provider system 140 to debit a financial account associated with the payor or credit a financial account against the payor's available credit. Accordingly, in some embodiments, the automatic payment method selection system 110 may store login credentials of financial accounts associated with the payor and transmit such credentials to the financial service provider system 140 as necessary to initiate such transactions.

According to some embodiments, if one or more of the accounts involved in the transfer are not associated with an entity associated with the automatic payment method selection system 110, then transaction server may communicate with the financial service provider system 140 to carry out the transfer. In some embodiments, system 100 may communicate with the financial service provider system 140 to obtain financial account information associated with the payor if the payor has financial accounts with an entity other than an entity associated with the automatic payment method selection system 110. According to some embodiments, system 100 may store financial account information of the payee in response to the payee submitting financial account information to system 100 via, for example, a software application on payee device 130 associated with the payee. Thus, in some embodiments, the payee may have a pre-registered user account with, for example, a software application that interfaces with the automatic payment method selection system 110, and the pre-registered user account may include financial account information sufficient to identify one or more financial accounts of the payee.

Although the preceding description describes various functions of the automatic payment method selection system 110 and the financial service provider system 140, in some embodiments, some or all of these functions may be carried out by a single computing device. For example, some or all of the functions of the automatic payment method selection system 110 and the financial service provider system 140 may be carried out by a single device.

Facilitating communication between components of the system 100, the network 150 may be of any suitable type, including individual connections via the Internet such as cellular or WiFi networks. In some embodiments, the network 150 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
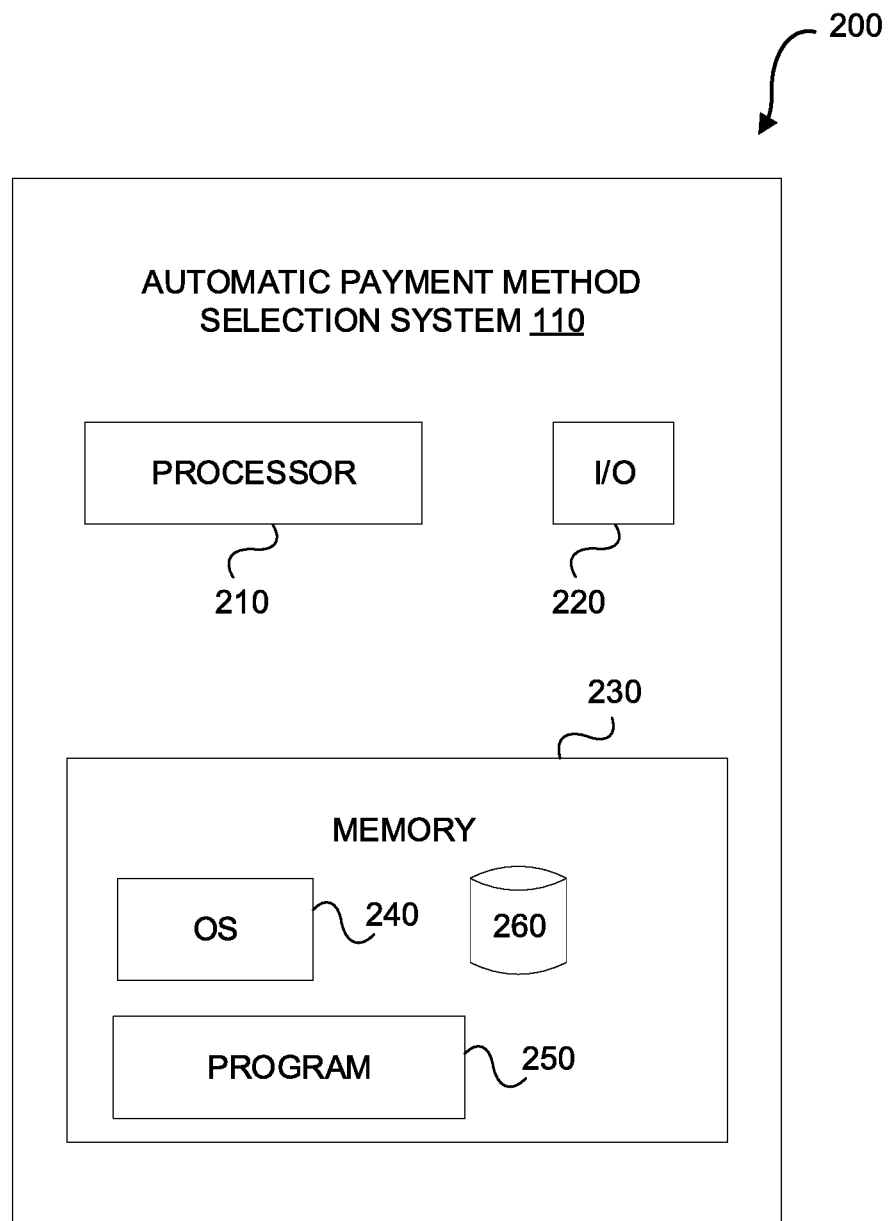
FIG. 2 is a component diagram of an optimal payment determination system in accordance with some exemplary embodiments.

As shown in more detail in FIG. 2, the automatic payment method selection system 110 may include a processor 210, an input/output ("I/O") device 220, a memory 230 containing an operating system ("OS") 240, a program 250, and a database 260. For example, the automatic payment method selection system 110 may be a single device or server or may be configured as a distributed computer system including multiple servers, devices, or computers that interoperate to perform one or more of the processes and functionalities associated with the disclosed embodiments. In some embodiments, the automatic payment method selection system 110 may further include a peripheral interface, a transceiver, a mobile network interface in communication with the processor 210, a bus configured to facilitate communication between the various components of the automatic payment method selection system 110, and a power source configured to power one or more components of the automatic payment method selection system 110. Servers, databases, and other computing devices (e.g., the financial service provider system 140) included in the system 100 may include many components that are similar to or even have the same capabilities as those described with respect to the automatic payment method selection system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Ryzen™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The automatic payment method selection system 110 may include one or more storage devices configured to store information used by the processor 210 (or other components) to perform certain functions related to the disclosed embodiments. In some embodiments, the automatic payment method selection system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the automatic payment method selection system 110 may include memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the automatic payment method selection system 110 may include memory 230 that may include one or more programs 250 to perform one or more functions of the disclosed embodiments. Moreover, the processor 210 may execute one or more programs 250 located remotely from the system 100. For example, the system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. Memory 230 may also include software, such as Hadoop™, enabling the system to store and process large volumes of data distributed across a cluster of commodity servers and commodity storage connected via the network 150. Memory 230 databases may consist of files on the system 100 that are simply read into the memory, and the disclosed embodiments are not limited to separate databases or even to the use of a database. Memory 230 may include software components that, when executed by the processor 210, perform one or more processes consistent with the disclosed embodiments. In some embodiments, the memory 230 may include a database 260 for storing related data to enable the automatic payment method selection system 110 to perform one or more of the processes and functionalities associated with the disclosed embodiments.

The automatic payment method selection system 110 may also be communicatively connected to one or more memory devices (e.g., databases) locally or through the network 150. The remote memory devices may be configured to store information and may be accessed and/or managed by the automatic payment method selection system 110. By way of example, the remote memory devices may be document management systems, Microsoft™ SQL database, Mongo databases, SharePoint™ databases, Oracle™ databases, Sybase™ databases, or other relational or non-relational databases. The remote memory devices may also include software, such as Hadoop™, enabling them to store and process large volumes of data distributed across a cluster of commodity servers and commodity storage connected via the network 150. These memory devices may consist of files on the system 100 that are simply read into the memory, and the disclosed embodiments are not limited to separate databases or even to the use of a database. Systems and methods consistent with disclosed embodiments, however, are not limited to separate databases or even to the use of a database.

The automatic payment method selection system 110 may also include one or more I/O devices 220 that may comprise one or more interfaces for receiving signals or input from devices and providing signals or output to one or more devices that allow data to be received and/or transmitted by the automatic payment method selection system 110. For example, the automatic payment method selection system 110 may include interface components, which may provide interfaces to one or more input devices, such as one or more keyboards, mouse devices, touch screens, track pads, trackballs, scroll wheels, digital cameras, microphones, sensors, scanners, and the like, that enable the automatic payment method selection system 110 to receive data from one or more users.

In exemplary embodiments of the disclosed technology, the automatic payment method selection system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the automatic payment method selection system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the automatic payment method selection system 110 may include a greater or lesser number of components than those illustrated.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

Figure 3:
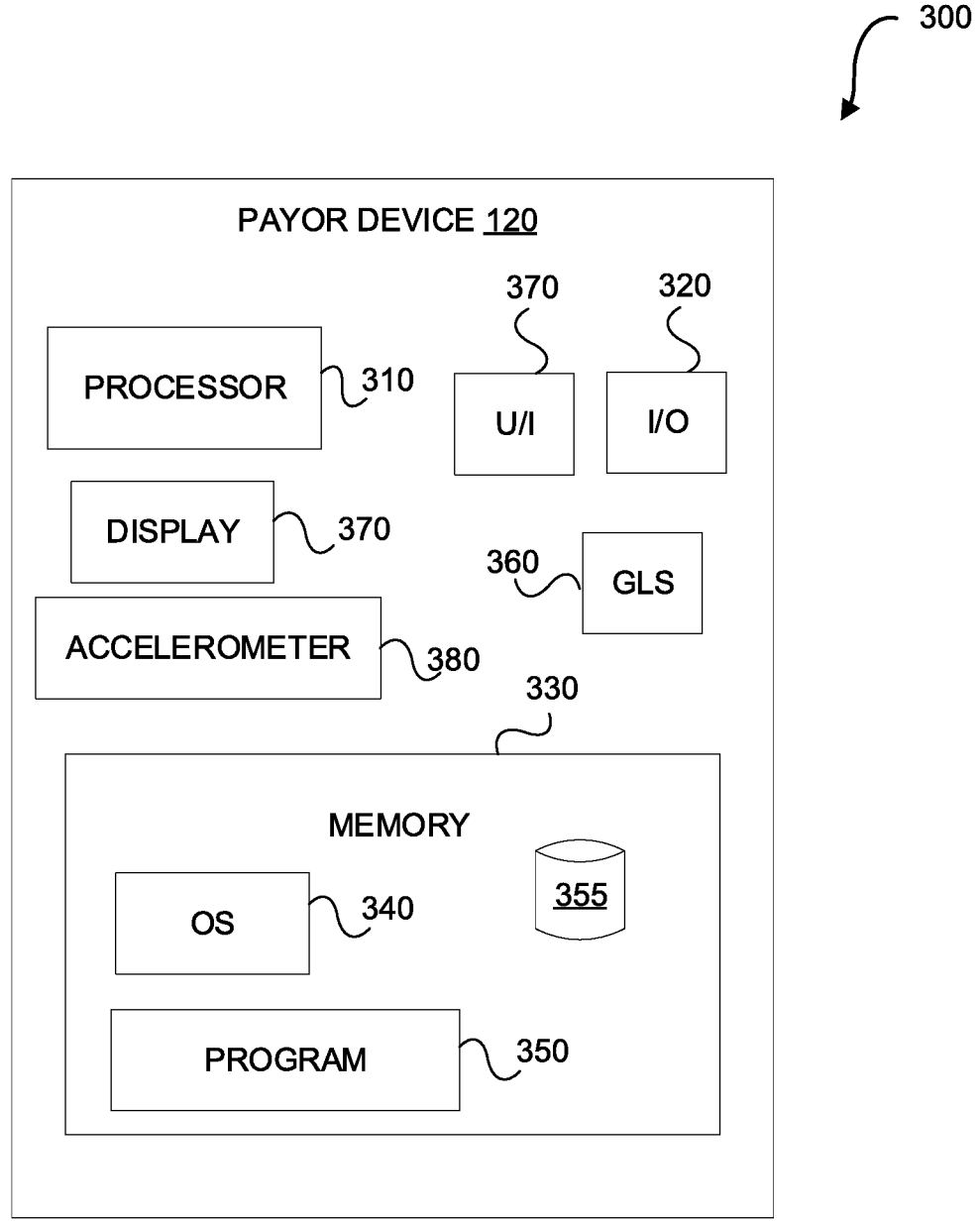
FIG. 3 is a component diagram of a payor computing device system in accordance with some exemplary embodiments.

FIG. 3 shows an examplary embodiment of the payor device 120. As shown, the payor device 120 may include a processor 310; an input/output ("I/O") device 320; a memory 330 containing an operating system ("OS") 340, a database 355, which may be any suitable repository of data, and/or a program 350; a geographic location sensor ("GLS") 360 for determining the geographic location of the payor device 120; a user interface ("U/I") device 370 for receiving user input data, such as data representative of a click, a scroll, a tap, a press, or typing on an input device that can detect tactile inputs; a gyroscope and/or an accelerometer 380 and/or any other sensor configured to detect motion of the payor device 120; and/or a display 390 for displaying digital images and/or video. As described in greater detail below, in some embodiments, program 350 may include an API that may be a software application configured to run on the payor device 120. According to some embodiments, the API may allow a payor to convey payments using a financial instrument such as a check and fund the payment in part against the payor's available credit and in part with the payor's cash holdings. In some embodiments, user input data may include biometric data associated with a user of the payor device 120 obtained by one or more sensors, such as a fingerprint scanner, a microphone, an image capture device, and the like. According to some embodiments, biometric data may be used to authenticate a payor's identity prior to sending payment using the system 100. For example, in some embodiments, the system 100 may require a payor to authenticate themselves using, for example, fingerprint data obtained from a fingerprint scanner of the payor device 120 prior to sending payment using the system 100. It will be understood that other such authentication methods such as facial recognition, voice recognition, gesture recognition, username/password login, multi-factor authentication (e.g., sending a user an authentication code via an email or text message) and the like may also be used in a similar manner. In some embodiments, I/O device 320 may include a transceiver for sending and receiving wireless signals, such as Wi-Fi, cellular, Bluetooth, near-field communication, and any other such type of signal. In some embodiments, the payor device 120 may further include a peripheral interface, a mobile network interface in communication with processor 310, a bus configured to facilitate communication between the various components of the payor device 120, and/or a power source configured to power one or more components of the payor device 120. According to some embodiment, electronic gifts may be transmitted and stored using standard encryption techniques to add additional security. The various components of the payor device 120 may include the same or similar attributes or capabilities of the same or similar components discussed with respect to the automatic payment method selection system 110; additionally other mobile computing devices (e.g., the payee device 130) included in the system 100 may include many components that are similar to or even have the same capabilities as those described with respect to the payor device 120.

Figure 4:
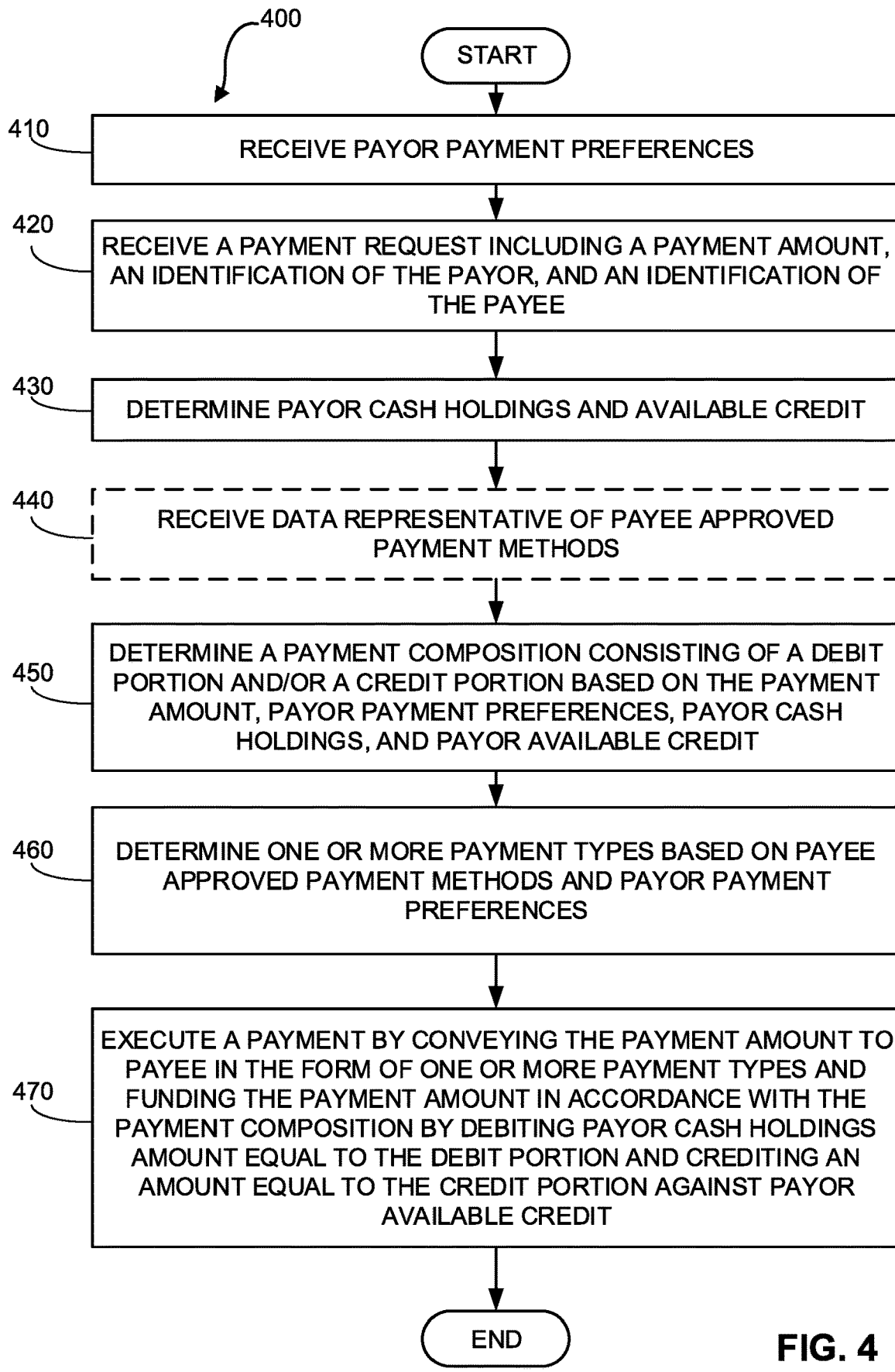
FIG. 4 is a flow diagram for executing a payment in accordance with some exemplary embodiments.

FIG. 4 shows a flowchart of a method 400 for executing a payment according to the disclosed example embodiments. Method 400 may be performed by a system including some or all of the automatic payment method selection system 110, the payor device 120, the payee device 130, and the financial service provider system(s) 140 (individually, 140A, 140B, etc.).

In block 410, the system 100 (e.g., via the automatic payment method selection system 110) may receive payor payment preferences associated with making a transaction via the system 100. According to some embodiments, the payor payment preferences may include payor preferences on payment type (e.g., paying with a check, an ACH, an ACH plus, a credit card, or a debit card) and payor preferences for payment composition (e.g., how a payment is funded—for example partially funded against the payor's available credit and partially funded by debiting the payor available cash holdings). In some embodiments, payor preferences may be modified if the payee approved payment methods do not allow the payor to pay with a certain payment type. For example, if the payee approved payment methods specify that the payor may not use a credit card payment type, and the payor preferences included paying by credit card, the system 100 may modify the payor preferences to use a different payment type. However, because the payment type (e.g., the instrument with which payment is made) and payment composition (e.g., the payment partially funded against the payor available credit and partially funded by payor cash holdings) are dissociated such that payor may access either debit or credit with any payment type, the payor may still make payment from both his/her available credit line and available cash holdings through any means that coincide with payee approved payment means (e.g., in the current example by check, debit card, ACH, and/or ACH plus).

In block 420, the system 100 (e.g., via the automatic payment method selection system 110) may receive a payment request (e.g., from the payee device 130). The payment request may include a payment amount, an identification of the payor, and an identification of a payee. The payee may initiate the payment request by uploading (e.g., via the I/O 320 such as the camera) the payment request to the system 100. According to some embodiments, the automatic payment method selection system 110 may store credentials associated with the payee financial account that may be accessed by system 100 to initiate a transfer of funds from a payor.

In block 430, the system 100 (e.g., via one of the automatic payment method selection system 110 or the financial service provider system 140) may determine payor cash holdings and available credit. In some embodiments, the entity implementing the automatic payment method selection system 110 is the same entity with which the payor has his/her financial accounts. For example, the automatic payment method selection system 110 may directly access payor cash holdings and available credit. In some embodiments, the payor has financial accounts with a third party financial service provider system, and the system 100 (via communication between the automatic payment method selection system 110 and the financial service provider system 140) may determine payor cash holdings and available credit. In some embodiments, the system 100 (e.g., via the automatic payment method selection system 110) may determine payor cash holdings and available credit via an API configured to communicate with third party financial institutions with which payor may have one or more financial accounts. For example, the automatic payment method selection system 110 may communicate with the financial service provider system 140 via an API configured to receive financial account information from the financial service provider system 140.

In block 440, the system 100 may receive (e.g., via the payee device 130) data representative of payee approved payment methods. In some embodiments, the payee has already been pre-registered with the system 100, and the system 100 may determine that the payee approved payment methods are already up to date. However, if the payor payment preferences do not align with the requirements of the payee approved payment methods, the system 100 may modify payor payment preferences as described in block 410. In some embodiments, receiving data representative of payee approved payment methods further includes transmitting a payee approved payment method request to the payee (e.g., via the payee device 130) by at least one of an interactive voice response system, an automated e-mail system, and/or an automated mailing system. For example, the system 100 (e.g., via the automatic payment method selection system 110) may determine that because the payee has initiated a payment request from a payor with which the payee has not made a previous transaction. In response, the system 100 (e.g., via the automatic payment method selection system 110) may determine that the payee should be contacted in order to update accepted payee methods of payment. Accordingly, the automatic payment method selection system 110 may communicate to the payee through one of the automated methods (e.g., by initiating an interactive voice response call to the payee device 130 prompting the payee to update data representative of payee approved payment methods).

In block 450, the system 100 (e.g., via the automatic payment method selection system 110) may determine a payment composition consisting of a debit portion and a credit portion based on the payment amount, payor payment preferences, payor cash holdings, and payor available credit. Because the payment composition and the payment type are disassociated when using the system 100, the payor may access a debit portion and a credit portion of available payor credit account and payor cash holdings no matter what type of payment type is used for the transaction (e.g., a debit card, a credit card, a check, etc.). Accordingly, payee accepted methods of payment do not affect the ability of the payor to fund payments according to the payor available credit line and payor cash holdings.

In block 460, the system 100 (e.g., via the automatic payment method selection system 110) may determine one or more payment types based on the payee approved payment methods and the payor payment preferences. According to some embodiments, the payor payment preferences may include payor preferences on payment type (e.g., paying with a check, an ACH, an ACH plus, a credit card, or a debit card) and payor preferences for payment composition (e.g., how a payment is funded—for example partially funded against the payor's available credit and partially funded by debiting the payor available cash holdings). As described in reference to block 410, payor preferences may be modified if the payee approved payment methods do not allow the payor to pay with a certain payment type. For example, if the payee approved payment methods specify that the payor may not use a credit card payment type, and the payor preferences included paying by credit card, the system 100 may modify the payor preferences to use a different payment type. However, because the payment type (e.g., the instrument with which payment is made) and payment composition (e.g., the payment partially funded against the payor available credit and partially funded by payor cash holdings) are dissociated such that payor may access either debit or credit with any payment type, the payor may still make payment from both his/her available credit line and available cash holdings through any means that coincide with payee approved payment means (e.g., in the current example by check, debit card, ACH, and/or ACH plus).

In block 470, the system 100 may execute, or direct execution of, a payment by conveying the payment amount to the payee in the form of one or more payment types (e.g., by credit card, debit card, check, ACH, or ACH plus) and funding the payment amount in accordance with the payment composition. For example, the payment composition may be funded by debiting the payor cash holdings an amount equal to the debit portion and crediting an amount equal to the credit portion against payor available credit as determined, both as determined in block 450. In some embodiments, a sum of the credit portion and the debit portion of the payment composition are equal to the total payment amount paid by the payor to the payee.

Figure 5:
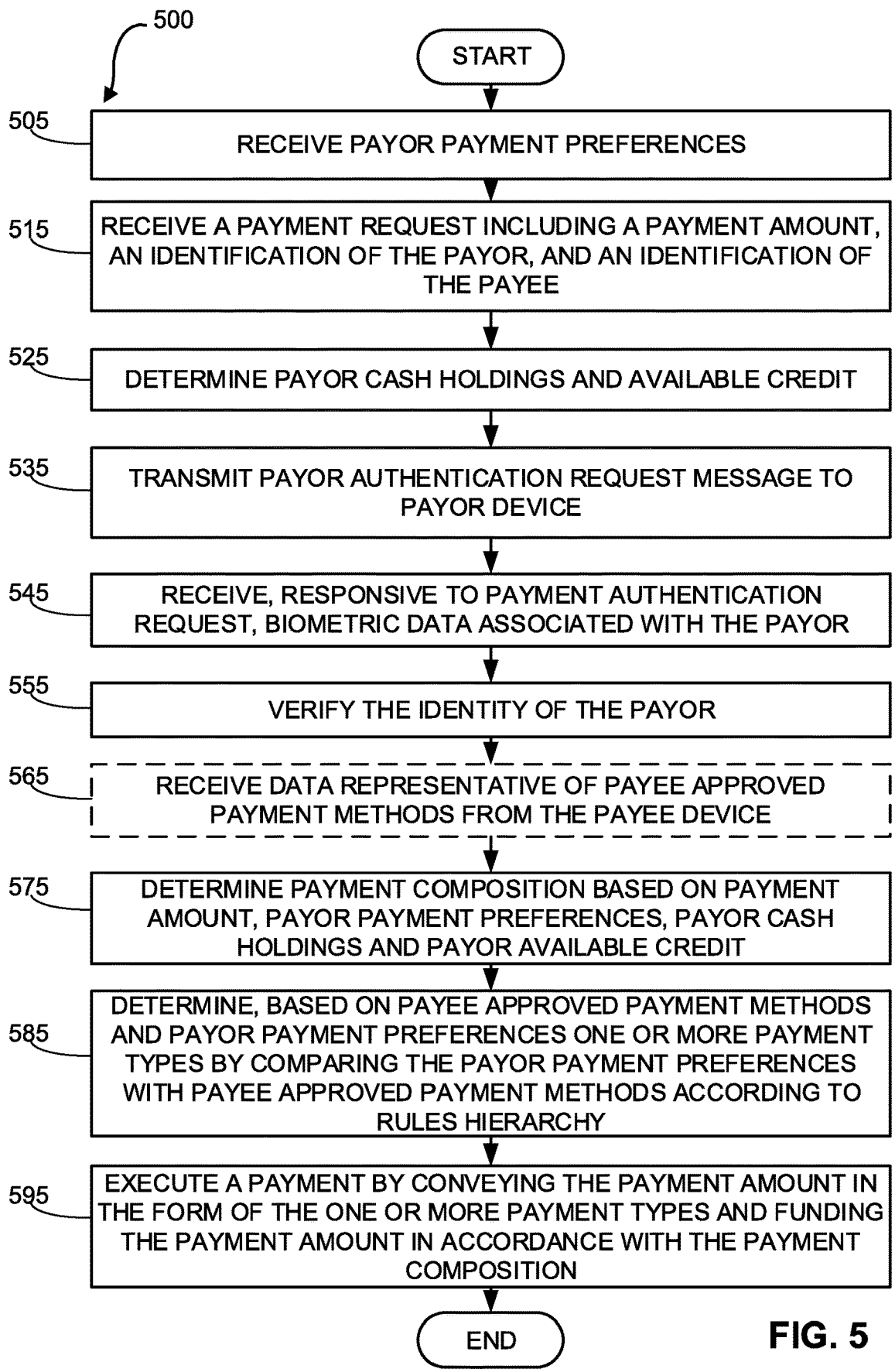
FIG. 5 is a flow diagram for executing a payment in accordance with other exemplary embodiments.

FIG. 5 shows a flowchart of a method 500 for executing a payment according to the disclosed example embodiments. Method 500 may be performed by a system including some or all of the automatic payment method selection system 110, the payor device 120, the payee device 130, and the financial service provider system(s) 140 (individually, 140A, 140B, etc.)

In block 505, the system 100 (e.g., via the automatic payment method selection system 110) may receive payor payment preferences associated with making a transaction via the system 100. According to some embodiments, the payor payment preferences may include payor preferences on payment type (e.g., paying with a check, an ACH, an ACH plus, a credit card, or a debit card) and payor preferences for payment composition (e.g., how a payment is funded—for example partially funded against the payor's available credit and partially funded by debiting the payor available cash holdings).

In block 515, the system 100 (e.g., via the automatic payment method selection system 110) may receive a payment request (e.g., from the payee device). The payment request may include a payment amount, an identification of the payor, and an identification of a payee. The payee may initiate the payment request by uploading (e.g., via the I/O 320 of the payee device 130 such as a camera) the payment request to the system 100. According to some embodiments, the automatic payment method selection system 110 may store credentials associated with the payee financial account that may be accessed by system 100 to initiate a transfer of funds from a payor.

In block 525, the system 100 (e.g., via one of the automatic payment method selection system 110 or the financial service provider system 140) may determine payor cash holdings and available credit. In some embodiments, the entity implementing the automatic payment method selection system 110 is the same entity with which the payor has his/her financial accounts. For example, the automatic payment method selection system 110 may directly access payor cash holdings and available credit. In some embodiments, the payor has financial accounts with a third-party financial service provider system, and the system 100 (via communication between the automatic payment method selection system 110 and the financial service provider system 140) may determine payor cash holdings and available credit. In some embodiments, the system 100 (e.g., via the automatic payment method selection system 110) may determine payor cash holdings and available credit via an API configured to communicate with third party financial institutions with which payor may have one or more financial accounts. For example, the automatic payment method selection system 110 may communicate with the financial service provider system 140 via an API configured to receive financial account information from the financial service provider system 140.

In block 535, the system may transmit a payor authentication request message to the payor device (e.g., via the automatic payment method selection system 110 sending the request to the payor device 120). The request to authenticate the payor may include a request for the payor device to obtain biometric data associated with the payor.

In block 545, the system 100 may further receive (e.g., from the payor device 120) a payment verification response including an indication that the payment request is valid. Additionally, the system 100 may receive biometric data obtained by one or more sensors of the payor device responsive to receiving the payment verification request. The biometric data may be associated with the payor and include at least one of a fingerprint scan, a retinal scan, a facial image, or a vocal sample.

In block 555, the system 100 may further verify the authenticity of the payment request, thereby verifying the identity of the payor. In some embodiments, this may involve comparing the received biometric data with stored biometric data of the payee to identify a match beyond a predetermined confidence level.

In block 565, the system 100 may receive (e.g., via payee device 130) data representative of payee approved payment methods. In some embodiments, the payee has already been pre-registered with the system 100 and the system may determine that the payee approved payment methods are already up to date in the system. However, if the payor payment preferences do not align with the requirements of the payee approved payment methods, the system may modify payor payment preferences as described with reference to FIG. 4. In some embodiments, receiving data representative of payee approved payment methods further includes transmitting a payee approved payment method request to the payee (e.g., via the payee device 130) by at least one of an interactive voice response system, an automated e-mail system, and/or an automated mailing system. The method may further include receiving a payee approved method response from the payee (e.g., via the payee device 130) and determining (e.g., via the automatic payment method selection system 110), based on the payee approved method response, one or more approved payment methods. For example, the system 100 (e.g., via the automatic payment method selection system 110) may determine that because the payee has initiated a payment request from a payor with which the payee has not made a previous transaction. In response, the system may determine that the payee should be contacted in order to update accepted payee methods of payment. Accordingly, the automatic payment method selection system 110 may communicate to the payee through one of the automated methods (e.g., by initiating an interactive voice response call to the payee device 130 prompting the payee to update data representative of payee approved payment methods).

In block 575, the system 100 (e.g., via the automatic payment method selection system 110) may determine a payment composition consisting of a debit portion and a credit portion based on the payment amount, payor payment preferences, payor cash holdings, and payor available credit. Because the payment composition and the payment type are disassociated when using the system 100, the payor may access a debit portion and a credit portion of available payor credit account and payor cash holdings no matter what type of payment type is used for the transaction (e.g., a debit card, a credit card, a check, etc.). Accordingly, payee accepted methods of payment do not affect the ability of the payor to fund payments according to the payor available credit line and payor cash holdings.

In block 585, the system 100 (e.g., via the automatic payment method selection system 110) may determine one or more payment types based on the payee approved payment methods and the payor payment preferences. According to some embodiments, the payor payment preferences may include payor preferences on payment type (e.g., paying with a check, an ACH, an ACH plus, a credit card, or a debit card) and payor preferences for payment composition (e.g., how a payment is funded—for example partially funded against the payor's available credit and partially funded by debiting the payor available cash holdings). Payor preferences may be modified if the payee approved payment methods do not allow the payor to pay with a certain payment type. For example, if the payee approved payment methods specify that the payor may not use a credit card payment type, and the payor preferences included paying by credit card, the system 100 may modify the payor preferences to use a different payment type. However, because the payment type (e.g., the instrument with which payment is made) and payment composition (e.g., the payment partially funded against the payor available credit and partially funded by payor cash holdings) are dissociated such that payor may access either debit or credit with any payment type, the payor may still make payment from both his/her available credit line and available cash holdings through any means that coincide with payee approved payment means (e.g., in the current example by check, debit card, ACH, and/or ACH plus). To determine the one or more payment types, the system 100 (e.g., via the automatic payment method selection system 110) may be configured to compare the payor payment preferences with the payee approved payment methods according to a rule hierarchy. The rule hierarchy may enable a payment type by the payor only if the payment type conforms to the payee approved payment methods.

In block 595, the system 100 (e.g., via the automatic payment method selection system 110) may execute, or direct execution of, a payment by conveying the payment amount to the payee in the form of one or more payment types (e.g., by credit card, debit card, check, ACH, or ACH plus) and funding the payment amount in accordance with the payment composition. For example, the payment composition may be funded by debiting the payor cash holdings an amount equal to the debit portion and crediting an amount equal to the credit portion against payor available credit as determined. In some embodiments, a sum of the credit portion and the debit portion of the payment composition are equal to the total payment amount paid by the payor to the payee. In some embodiments, conveying the payment amount to the payee in the form of the one or more payment types includes receiving a merchant identifier associated with a preexisting user account and determining, based on a machine learning trained algorithm that the identification the payee corresponds to is the merchant identifier. Responsive to this determination, the system may convey at least a portion of the payment amount to the identified preexisting payee account.

Figure 6:
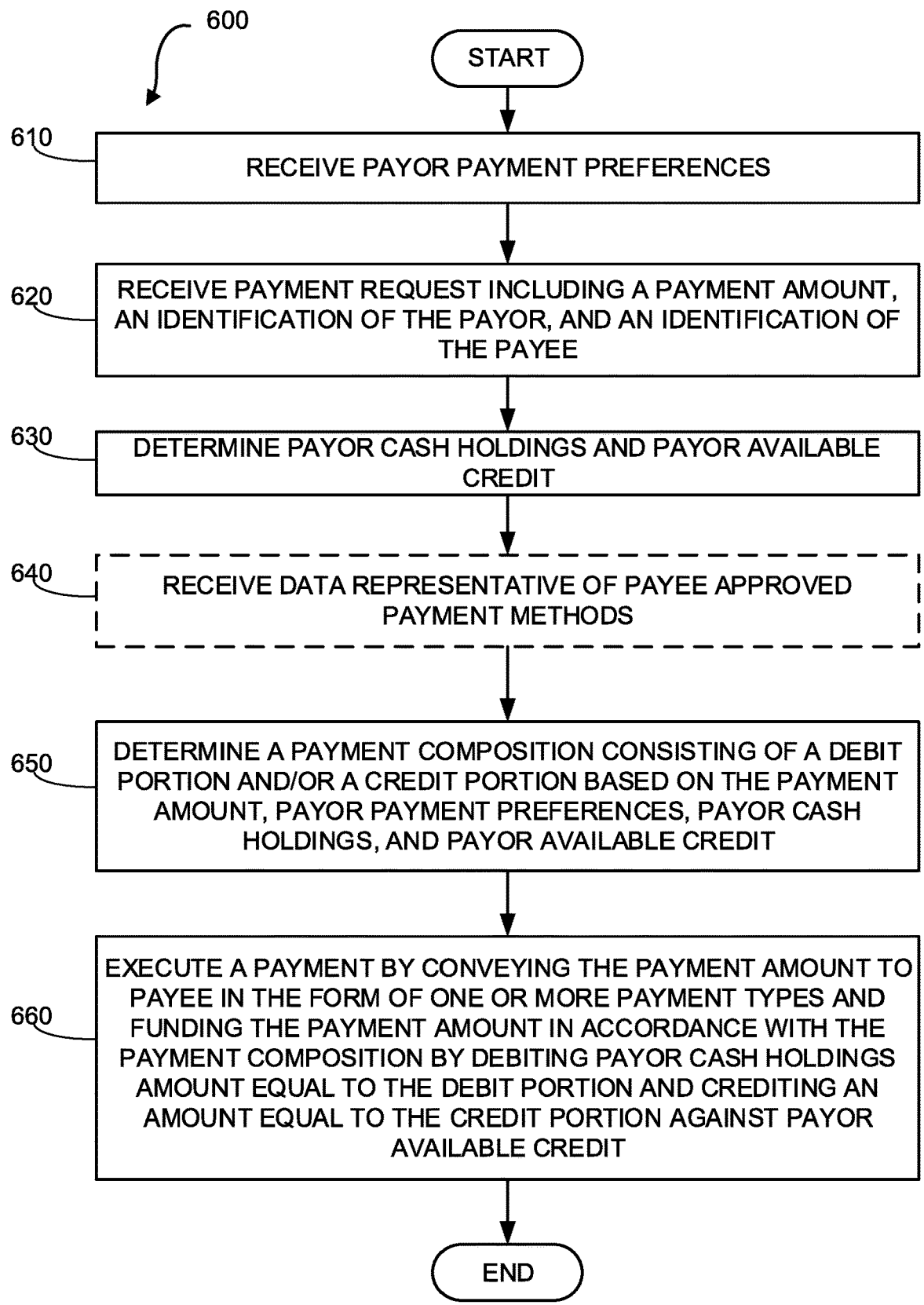
FIG. 6 is a flow diagram for executing a payment in accordance with further exemplary embodiments.

FIG. 6 shows a flowchart of a method 600 for executing a payment according to the disclosed example embodiments. Method 600 may be performed by a system including some or all of the automatic payment method selection system 110, the payor device 120, the payee device 130, and the financial service provider system(s) 140 (individually, 140A, 140B, etc.)

In block 610, the system 100 (e.g., via the automatic payment method selection system 110) may receive payor payment preferences. According to some embodiments, the payor payment preferences may include payor preferences on payment type (e.g., paying with a check, an ACH, an ACH plus, a credit card, or a debit card) and payor preferences for payment composition (e.g., how a payment is funded—for example partially funded against the payor's available credit and partially funded by debiting the payor available cash holdings).

In block 620, the system 100 (e.g., via the automatic payment method selection system 110) may receive a payment request (e.g., from the payee device). The payment request may include a payment amount, an identification of the payor, and an identification of a payee. The payee may initiate the payment request by uploading (e.g., via the I/O 320 such as the camera) the payment request to the system 100. According to some embodiments, the automatic payment method selection system 110 may store credentials associated with the payee financial account that may be accessed by system 100 to initiate a transfer of funds from a payor.

In block 630, the system 100 (e.g., via one of the automatic payment method selection system 110 or the financial service provider system 140) may determine payor cash holdings and available credit. In some embodiments, the entity implementing the automatic payment method selection system 110 is the same entity with which the payor has his/her financial accounts. For example, the automatic payment method selection system 110 may directly access payor cash holdings and available credit. In some embodiments, the payor has financial accounts with a third party financial service provider system, and the system 100 (via communication between the automatic payment method selection system 110 and the financial service provider system 140) may determine payor cash holdings and available credit. In some embodiments, the system 100 (e.g., via the automatic payment method selection system 110) may determine payor cash holdings and available credit via an API configured to communicate with third party financial institutions with which payor may have one or more financial accounts. For example, the automatic payment method selection system 110 may communicate with the financial service provider system 140 via an API configured to receive financial account information from the financial service provider system 140.

In block 640, the system 100 may receive (e.g., via payee device 130) data representative of payee approved payment methods. In some embodiments, the payee has already been pre-registered with the system 100 and the system may determine that the payee approved payment methods are already up to date in the system. However, if the payor payment preferences do not align with the requirements of the payee approved payment methods, the system may modify payor payment preferences. In some embodiments, receiving data representative of payee approved payment methods further includes transmitting a payee approved payment method request to the payee (e.g., via the payee device 130) by at least one of an interactive voice response system, an automated e-mail system, and/or an automated mailing system. For example, the system may determine that because the payee has initiated a payment request from a payor with which the payee has not made a previous transaction. Responsive, the system may determine that the payee should be contacted in order to update accepted payee methods of payment. Accordingly, the automatic payment method selection system 110 may communicate to the payee through one of the automated methods (e.g., by initiating an interactive voice response call to the payee device 130 prompting the payee to update data representative of payee approved payment methods).

In block 650, the system 100 (e.g., via the automatic payment method selection system 110) may determine a payment composition consisting of a debit portion and a credit portion based on the payment amount, payor payment preferences, payor cash holdings, and payor available credit. Because the payment composition and the payment type are disassociated when using the system 100, the payor may access a debit portion and a credit portion of available payor credit account and payor cash holdings no matter what type of payment type is used for the transaction (e.g., a debit card, a credit card, a check, etc.). Accordingly, payee accepted methods of payment do not affect the ability of the payor to fund payments according to the payor available credit line and payor cash holdings.

In block 660, the system 100 (e.g., via the automatic payment method selection system 110) may execute, or direct execution of, a payment by conveying the payment amount to the payee in the form of one or more payment types (e.g., by credit card, debit card, check, ACH, or ACH plus) and funding the payment amount in accordance with the payment composition. For example, the payment composition may be funded by debiting the payor cash holdings an amount equal to the debit portion and crediting an amount equal to the credit portion against payor available credit as determined, both as determined in block 650. In some embodiments, a sum of the credit portion and the debit portion of the payment composition are equal to the total payment amount paid by the payor to the payee.

Figure 7:
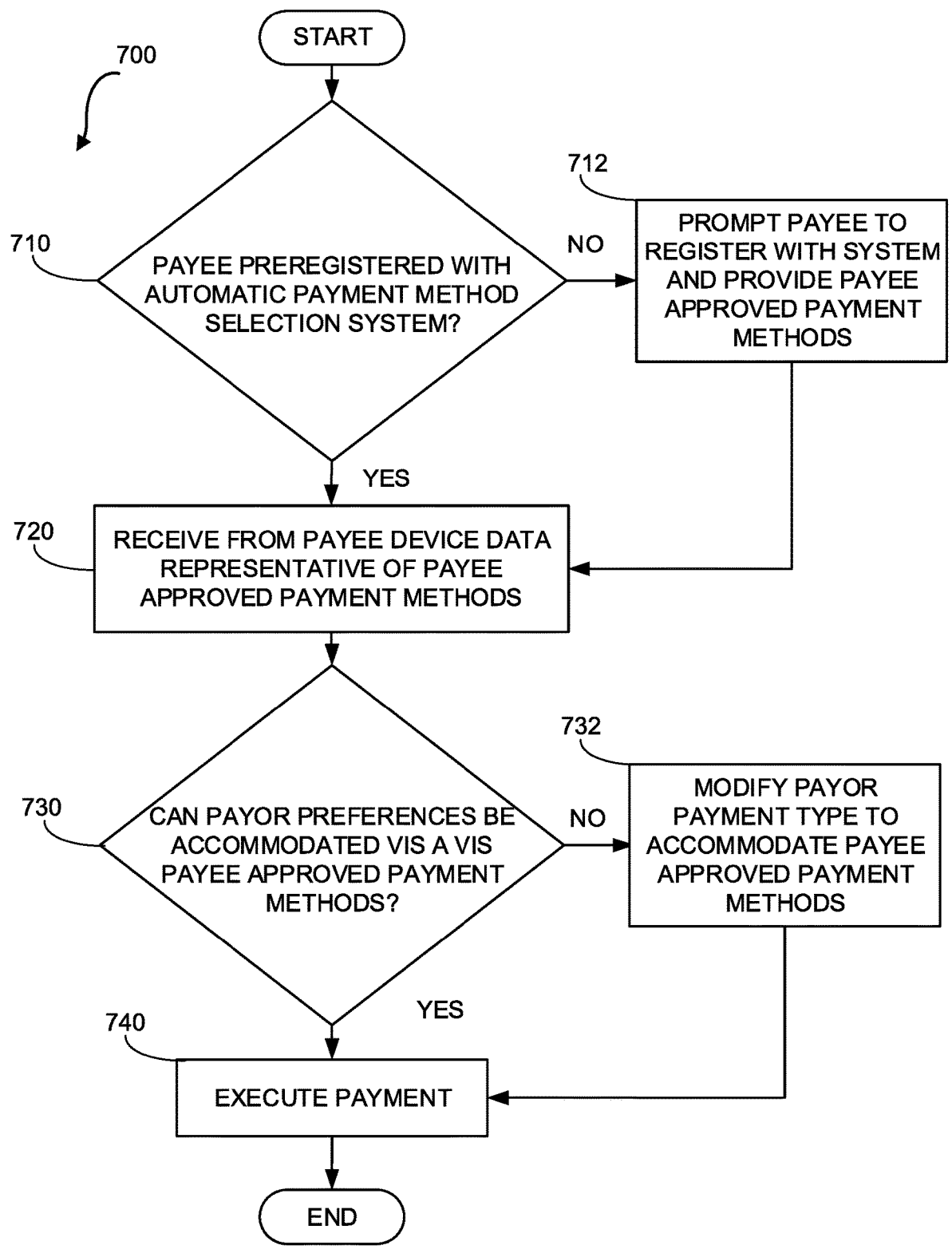
FIG. 7 is a flow diagram for determining whether payor preferences can be accommodated vis a vis payee approved payment methods.

FIG. 7 shows a flowchart of a method 700 for modifying payor payment type to accommodate payee approved payment methods before executing a payment according to the disclosed example embodiments. Method 700 may be performed by a system including some or all of the automatic payment method selection system 110, the payor device 120, the payee device 130, and the financial service provider system(s) 140 (individually, 140A, 140B, etc.)

In decision block 710, the system (e.g., via the automatic payment method selection system 110) may determine whether the payee has been preregistered with the automatic payment method selection system 110. If the payee not been registered with the system, the payee is prompted to register and provide payee approved payment methods in block 712 (e.g., via one of the I/O 330 of the payee device 130).

In block 720, the system receives from the payee device 130 data representative of payee approved payment methods. The data representative of payee approved payment methods may be previously stored within the system 100 if the payee has been preregistered with system as in block 710, but also may be newly entered into the system by the payee via the payee device 130 as described in reference to block 712.

In decision block 730, the system (e.g., via the automatic payment method selection system 110) determines whether the payor preferences may be accommodated with respect to the payee approved payment methods. That is, whether the payor preferences may be allowed under a rule hierarchy which requires that the payee approved payment methods be satisfied first with payor preference being modified by system 100 when the payee approved payment methods would not allow payor to complete a payment according to the payor preferences.

In block 732, the system may modify payor preferences to accommodate payee approved payment methods. For example, if the payee approved payment methods require a payment made by a check payment type, the payor preferences may be modified set payment type to be by check.

In block 740, the payment from the payor to payee is executed according to the payee approved payment methods and payor payment preferences, where the payor payment type may be modified to accommodate payee approved payment methods. As in other exemplary methods described in FIGS. 4-6, payment may be executed by conveying the payment amount to the payee in the form of the one or more payment types and funding the payment amount in accordance with the payment composition. The payment may be funded by debiting the payor cash holdings an amount equal to the debit portion and crediting an amount equal to the credit portion against the payor available credit.

Exemplary Use Cases

The following exemplary use case describes an example of a typical user flow pattern. They are intended solely for explanatory purposes and not in limitation. A merchant (the "payee") may wish to provide a payment request to a purchaser (the "payor") for goods and/or services the merchant has or will provide to the purchaser. To create the purchase order, the merchant may open a mobile application (e.g., a program 350 on the payee device 130) and use the application to upload a payment request. The payment request may include data representative of a payment amount (e.g., the amount owed by payor for the services provided by the merchant payee), an identification of the payor and an identification of the payee. In some cases, the payee may not be perfectly identified in the payment request. For example, the payee may be identified as "STPLS" in the system 100 as part of the payment request. In such cases, the system 100 (e.g., via the automatic payment method selection system 110) may use the received merchant identifier associated with the preexisting payee account and determine, based on a machine learning trained algorithm, whether the identification the payee corresponds to is the merchant identifier. In the present example, the machine learning trained algorithm may recognize that "STPLS" corresponds to the preexisting payee account for the payee "Staples, Inc." The system 100 (e.g., via the automatic payment method selection system 110) may be capable of finding that "STPLS" matches to the preexisting payee account for "Staples, Inc." beyond a predetermined threshold. Responsive to finding that the payee does correspond to the merchant identifier, the system may convey at least a portion of the payment amount to the preexisting payee account. After the payment request has been received, the system 100 (e.g., via the automatic payment method selection system 110) may further determine payor cash holdings and payor available credit by identifying the payor financial institution responsive to the received identification of the payor in the previous step. The system 100 (e.g., via the automatic payment method selection system 110) may receive payor payment preferences associated with the payor. The payor payment preferences may relate to both the payment type used to make the payment and the payment composition (e.g., a credit portion and a debit portion) to be used in making the payment. When the payor financial institution(s) are not the same entity as the entity administering the automatic payment method selection system 110, the system may receive, via an API, data representative of the payor cash holdings and payor available credit from the third party financial institution(s) with which the payor has financial account(s) to be used with the system 100.

After the payor cash holdings and available credit have been determined, the system 100 (e.g., via the automatic payment method selection system 110) may transmit a payor authentication request message to the payor (e.g., via the payor device 120). In response to the authentication request message, the payor (e.g., via the payor device 120) may provide biometric data obtained from one or more sensors associated with the payor device 120 to the system 100 (e.g., via the automatic payment method selection system 110). The biometric data received may include at least one of a fingerprint scan, a retinal scan, a facial image, or a vocal sample obtained via one of the numerous I/O 330 of the payor device 120 (e.g., via the fingerprint scanner, camera, or microphone). The system 100 (e.g., via the automatic payment method selection system 110) may then compare the received biometric data with stored biometric data to identify a match that exceeds a predetermined confidence threshold in order to verify the identity of the payor.

After the payor has been verified, the system 00 (e.g., via the automatic payment method selection system 110) may receive data representative of payee approved payment methods. The payee may be preregistered with the system in which case the system already may have received the payee approved payment methods at an earlier time. If the system 100 (e.g., via the automatic payment method selection system 110) detects that the current transaction is between a preregistered payee and a payor with which the payee has not transacted, the system may request payee approved payment methods be updated by a payee (e.g., via the I/O 330 of payee device 130). Finally, the system 100 (e.g., via the automatic payment method selection system 110) may determine a payment composition based on the determined payment amount, payor payment preferences, payor cash holdings and payor available credit. The funds may be conveyed to the payee in the form of the one or more determined payment types and funded in accordance with the payment composition by debiting the payor cash holdings an amount equal to the debit portion of the payment composition and crediting an amount equal to the credit portion against the payor available credit.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automatic payment method selection system, comprising:
one or more processors; and
a memory in communication with the one or more processors and storing instructions that, when executed by the one or more processors, are configured to cause the system to:
receive payor payment preferences associated with a payor from a payor device, the payor payment preferences comprising a predetermined preferred payment composition comprising a debit portion associated with at least one debit account of the payor and a credit portion associated with at least one credit account of the payor;
after receiving the payor payment preferences, receive a payment request, the payment request comprising data representative of a payment amount payable to a payee and the payment request made against one of the at least one credit account or the at least one debit account;
determine payor cash holdings and payor available credit by:
transmitting, via an API, to one or more service provider systems, a status request of the at least one debit account and the at least one credit account; and
receiving, via an API, from the one or more service provider systems, an indication of the at least one debit account and the at least one credit account;
execute a payment in accordance with the preferred payment composition comprising:
funding the payment amount, in accordance with the preferred payment composition, from the payor by:
debiting the at least one debit account an amount equal to the debit portion; and
crediting an amount equal to the credit portion against the at least one credit account.

2. The system of claim 1, wherein the payment types are selected from a check and a credit card, and the memory stores further instructions that are configured to cause the system to:
receive, from a payee device associated with the payee, data representative of payee approved payment methods; and
determine, based on the payee approved payment methods and the preferred payment composition, one or more payment instruments, wherein each of the one or more payment instruments are accepted by the payee in accordance with the payee approved payment methods.

3. The system of claim 2, wherein receiving data representative of payee approved payment methods comprises:
transmitting a payee approved payment method request to the payee via at least one of an interactive voice response system, an automated e-mail system, and an automated mailing system;
receiving a payee approved method response from the payee; and
determining, based on the payee approved method response, one or more approved payment methods.

4. The system of claim 1, wherein the memory stores further instructions that are configured to cause the system to:
responsive to receiving the payor payment preferences, store the payor payment preferences in a user account associated with the payor; and
responsive to receiving the payment request, retrieve the stored payor payment preferences from the user account associated with the payor.

5. The system of claim 4, wherein the memory stores further instructions that are configured to cause the system to:
determine that the preferred payment composition is not consistent with the payee approved payment methods;
modify the preferred payment composition to be consistent with the payee approved payment methods; and
update the user account with the modified preferred payment composition.

6. The system of claim 1, wherein the payment request is received responsive to the payee uploading the payment request to the payee device, wherein uploading the payment request comprises taking a photo of the payment request using the payee device.

7. An automatic payment method selection system, comprising:
one or more processors; and
a memory in communication with the one or more processors and storing instructions that, when executed by the one or more processors, are configured to cause the system to:
receive payor payment preferences associated with a payor from a payor device, the payor payment preferences comprising a predetermined preferred payment composition comprising a debit portion associated with a debit account of the payor and a credit portion associated with a credit account of the payor;
after receiving the payor payment preferences, receive a payment request comprising data representative of a payment amount payable to a payee and the payment request made against one of the credit account or the debit account;
determine, payor cash holdings and payor available credit;
responsive to the payor payment preferences being consistent with payee approved payment methods, execute a payment in accordance with the preferred payment composition comprising:
funding the payment amount, in accordance with the preferred payment composition, from the payor by:
debiting the debit account an amount equal to the debit portion; and
crediting an amount equal to the credit portion against the credit account.

8. The system of claim 7, wherein the memory stores further instructions that are configured to cause the system to:
transmit a payor authentication request message to a payor device;
receive, from a payee device associated with the payee, data representative of payee approved payment methods;
determine, based on the payee approved payment methods and the preferred payment composition, one or more payment instruments, wherein determining the one or more payment instruments comprises:

comparing the payor payment preferences with the payee approved payment methods according to a rule hierarchy, wherein the rule hierarchy enables a payment instrument by the payor only if the payment instrument conforms to the payee approved payment methods.

9. The system of claim 8, wherein receiving data representative of payee approved payment methods comprises:
transmitting a payee approved payment method request to the payee via at least one of an interactive voice response system, an automated e-mail system, and an automated mailing system;
receiving a payee approved method response from the payee; and
determining, based on the payee approved method response, one or more approved payment methods.

10. The system of claim 8, wherein the memory stores further instructions that are configured to cause the system to:
responsive to the payor payment preferences not being consistent with the payee approved payment methods:
automatically modify the preferred payment composition in order to be consistent with the payee approved payment methods according to the rule hierarchy; and
execute a payment in accordance with the modified payment composition.

11. The system of claim 7, wherein the payment request is received responsive to the payee uploading the payment request to the payee device.

12. The system of claim 11, wherein uploading the payment request comprises taking a photo of the payment request using the payee device.

13. An automatic payment method selection system, comprising:
one or more processors; and
a memory in communication with the one or more processors and storing instructions that, when executed by the one or more processors, are configured to cause the system to:
receive payor payment preferences associated with a payor from a payor device, the payor payment preferences comprising a predetermined preferred payment composition comprising a debit portion associated with a payment made from payor cash holdings and a credit portion associated with a payment made against payor available credit;
after receiving the payor payment preferences, receive a payment request comprising data representative of a payment amount payable to a payee and the payment request made against one of a credit account associated with the credit portion or a debit account associated with the debit portion;
determine payor cash holdings and payor available credit by:
identifying one or more financial service provider systems of the payor;
transmitting, via an API, to the one or more financial service provider systems, a request regarding the payor cash holdings or payor available credit; and
receiving, via an API, from the one or more financial service provider systems, an indication of the payor cash holdings or payor available credit;
receive, from a payee device associated with the payee, data representative of payee approved payment methods; and
responsive to the payor payment preferences being consistent with the payee approved payment methods, execute a payment in accordance with the preferred payment composition comprising:
conveying at least a portion of the payment amount to the preexisting payee account by:
debiting the payor cash holdings an amount equal to the debit portion; and
crediting an amount equal to the credit portion against the payor available credit.

14. The system of claim 13, wherein receiving data representative of payee approved payment methods comprises:
transmitting a payee approved payment method request to the payee via at least one of an interactive voice response system, an automated e-mail system, and an automated mailing system;
receiving a payee approved method response from the payee; and
determining, based on the payee approved method response, one or more approved payment methods.

15. The system of claim 13, wherein the payment request is received from the payee device.

16. The system of claim 15, wherein the payment request is received responsive to the payee uploading the payment request to the payee device.

17. The system of claim 16, wherein uploading the payment request comprises taking a photo of the payment request using the payee device.

18. The system of claim 13, wherein:
a sum of the credit portion and the debit portion of the payment composition are equal to the payment amount, and
executing a payment further comprises:
receive a merchant identifier associated with a preexisting payee account;
determine, based on a machine learning trained algorithm, that the payee corresponds to the merchant identifier, wherein:
determining that the payee corresponds to the merchant identifier utilizes input data comprising the name of the payee, the type or category of payee, the location or address of the payee, and third party data from publicly available online sources.

\* \* \* \* \*